(12) United States Patent
Sunshine et al.

(10) Patent No.: US 10,145,036 B1
(45) Date of Patent: Dec. 4, 2018

(54) ITEMS WITH CONDUCTIVE YARN

(71) Applicant: Apple Inc., Cupertino, CA (US)

(72) Inventors: Daniel D. Sunshine, Sunnyvale, CA (US); Daniel A. Podhajny, San Jose, CA (US); Joseph B. Walker, Saratoga, CA (US); Srinivasan Venkatraman, San Jose, CA (US); Christopher A. Schultz, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/586,121

(22) Filed: May 3, 2017

Related U.S. Application Data

(60) Provisional application No. 62/331,897, filed on May 4, 2016.

(51) Int. Cl.
| | |
|---|---|
| *G03D 15/02* | (2006.01) |
| *D03D 1/00* | (2006.01) |
| *D03D 15/00* | (2006.01) |
| *D03D 15/02* | (2006.01) |
| *G06F 3/044* | (2006.01) |

(52) U.S. Cl.
CPC ....... *D03D 1/0088* (2013.01); *D03D 15/0027* (2013.01); *D03D 15/02* (2013.01); *G06F 3/044* (2013.01); *G06F 2203/04104* (2013.01)

(58) Field of Classification Search
None
See application file for complete search history.

(56) References Cited

U.S. PATENT DOCUMENTS

| | | | |
|---|---|---|---|
| 3,882,667 A | 5/1975 | Barry | |
| 4,803,094 A | 2/1989 | Myers | |
| 5,298,322 A | 3/1994 | Hennecken et al. | |
| 5,532,052 A | 7/1996 | Eng et al. | |
| 6,274,519 B1 | 8/2001 | Omori et al. | |
| 9,830,783 B1 * | 11/2017 | Kessler | G08B 6/00 |
| 9,894,789 B1 * | 2/2018 | Hamada | H05K 999/99 |
| 2011/0068098 A1 * | 3/2011 | Li | H05B 3/146 219/542 |
| 2012/0225275 A1 * | 9/2012 | Honma | D02G 3/12 428/222 |
| 2013/0102217 A1 * | 4/2013 | Jeon | D03D 15/0027 442/182 |
| 2013/0260630 A1 * | 10/2013 | Ito | D03D 1/00 442/205 |
| 2016/0100480 A1 * | 4/2016 | Van Keymeulen | H05K 1/0283 174/254 |

(Continued)

*Primary Examiner* — Tony Davis
(74) *Attorney, Agent, or Firm* — Treyz Law Group, P.C.; G. Victor Treyz; Kendall W. Abbasi

(57) ABSTRACT

A fabric-based item may have fabric with conductive strands of material. The conductive strands of material may include conductive yarn formed from insulating fibers and conductive fibers. The conductive fibers may be metal wires. The insulating fibers in the conductive yarn may hide the conductive fibers from view. The fabric may be woven fabric or other fabric with intertwined strands of material. The woven fabric may include conductive and insulating warp yarns and conductive and insulating weft yarns. Conductive yarn may be coupled to capacitive touch sensor circuitry and may form a capacitive touch sensor grid or other capacitive touch sensor electrode structures. Conductive yarn may also be soldered or otherwise coupled to electrical components.

19 Claims, 5 Drawing Sheets

(56) References Cited

U.S. PATENT DOCUMENTS

| | | | |
|---|---|---|---|
| 2016/0145776 A1* | 5/2016 | Roh | D02G 3/441 |
| | | | 57/211 |
| 2017/0056644 A1* | 3/2017 | Chahine | A61N 1/0452 |
| 2017/0107647 A1* | 4/2017 | Riethmuller | D02G 3/36 |
| 2017/0175305 A1* | 6/2017 | Thompson | A41D 1/002 |
| 2017/0233903 A1* | 8/2017 | Jeon | D03D 1/0088 |
| | | | 139/425 R |
| 2017/0247820 A1* | 8/2017 | Podhajny | D03D 1/0088 |
| 2017/0249033 A1* | 8/2017 | Podhajny | G06F 3/0416 |
| 2017/0251555 A1* | 8/2017 | Sunshine | D03D 1/0088 |
| 2018/0003579 A1* | 1/2018 | Esposito | G01L 5/0052 |
| 2018/0073172 A1* | 3/2018 | Kurahashi | D04B 1/18 |
| 2018/0195218 A1* | 7/2018 | Hamada | D04B 21/14 |

* cited by examiner

ITEMS WITH CONDUCTIVE YARN

This application claims the benefit of provisional patent application No. 62/331,897, filed May 4, 2016, which is hereby incorporated by reference herein in its entirety.

FIELD

This relates generally to yarn and, more particularly, to items with conductive yarn.

BACKGROUND

Conductive yarns and other conductive strands of material may be used in forming woven fabric and other items. In some applications, it may be desirable for conductive strands to carry electrical current. For example, in a fabric item that has electrical circuitry, it may be desirable to couple conductive strands to the circuitry and to use the conductive strands to carry signals. Conductive strands may be formed from intertwined strands of bare wire, but this type of conductive strand may not have an acceptable appearance for many items.

SUMMARY

A fabric-based item may have fabric with conductive strands of material. The conductive strands of material may include conductive yarn formed from insulating fibers and conductive fibers. The conductive fibers in the conductive yarn may be metal wires. The insulating fibers in the conductive yarn may be spun around the metal wires and may hide the metal wires from view.

The fabric may have intertwined strands of material such as conductive yarn and insulating yarn. The fabric may be woven fabric that includes conductive and insulating warp yarns and that includes conductive and insulating weft yarns. Conductive yarn may be coupled to control circuitry in a fabric-based item. Conductive yarn may, for example, be coupled to capacitive touch sensor circuitry and may form a capacitive touch sensor grid or other capacitive touch sensor electrode structures. Conductive yarn may also be soldered or otherwise coupled to electrical components and used in routing signals between the electrical components and the control circuitry.

The fabric that includes the conductive yarn and the sensors or other components formed from the conductive yarn may form a housing wall or other layer in an item such as a fabric-based item.

DETAILED DESCRIPTION

Figure 1:
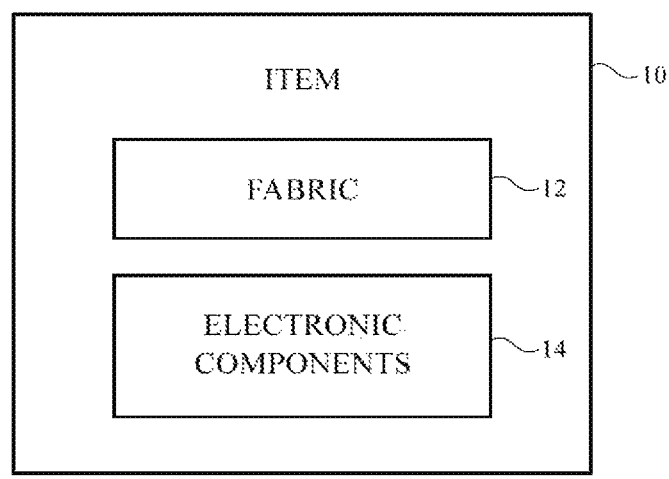
FIG. 1 is a schematic diagram of an illustrative item that may include fabric with conductive yarn in accordance with an embodiment.

An item such as a fabric-based item may contain fabric formed from intertwined strands of material. As shown in FIG. 1, for example, item 10 may contain fabric 12. Item 10 may also include circuitry such as electrical components 14. The circuitry of components 14 may include input-output devices such as buttons, touch sensors, light-based sensors such as light-based proximity sensors, force sensors, environmental sensors such as temperature sensors and humidity sensors, other sensors, status indicator lights and other light-based components such as light-emitting diodes for forming displays and other light-emitting structures, vibrators or other haptic output devices, etc. The circuitry of components 14 may also form control circuitry (e.g., processors, touch sensor circuits, etc.). Fabric 12 may, if desired, include conductive strands of material that are coupled to electrical components 14, control circuitry formed from processors and other circuits in components 14, and other circuitry in item 10. The conductive strands may serve as signal paths that carry signals between input-output components and control circuitry and may serve as capacitive touch sensor electrodes and other conductive structures in item 10.

The control circuitry formed from components 14 may include processors (e.g., microprocessors, microcontrollers, digital signal processors, baseband processors in wireless circuits, application-specific integrated circuits, and other control circuitry), may include control circuitry for processing sensor signals (e.g., capacitive touch sensor circuitry for gathering touch sensor data from capacitive sensor electrodes), and may include storage (e.g., volatile and non-volatile memory for storing data and code, etc.).

Item 10 may be a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic item 10 is mounted in a kiosk, in an automobile, airplane, or other vehicle, other electronic equipment, or equipment that implements the functionality of two or more of these devices. If desired, item 10 may be a removable external case for electronic equipment or other device accessory, may be a strap, may be a wrist band or head band, may be a removable cover for a device, may be a case or bag that has straps or that has other structures to receive and carry electronic equipment and other items, may be a necklace or arm band, may be a wallet, sleeve, pocket, or other structure into which electronic equipment or other items may be inserted, may be part of a chair, sofa, or other seating (e.g., cushions or other seating structures), may be part of an item of clothing or other wearable item (e.g., a hat, belt, wrist band, headband, shirt, pants, shoes, etc.), or may be any other suitable item that includes circuitry.

Figure 2:
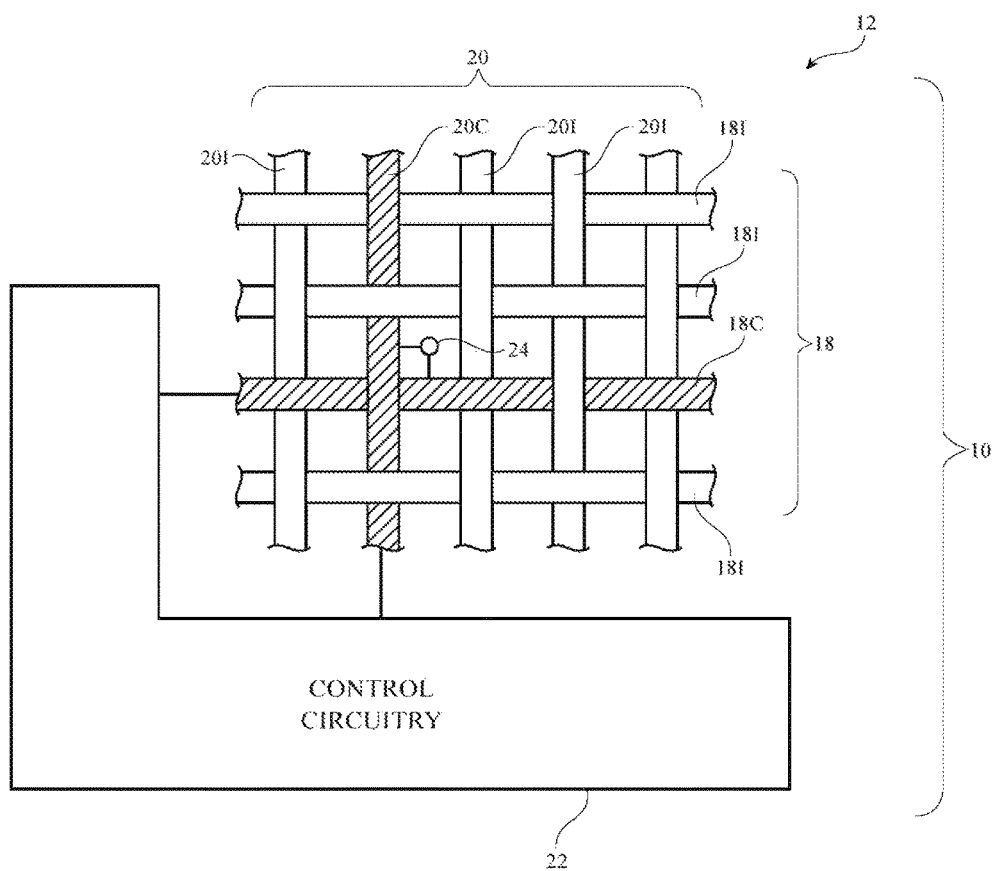
FIG. 2 is a diagram showing how conductive yarn in a fabric may be coupled to control circuitry in accordance with an embodiment.

As shown in FIG. 2, item 10 may include fabric 12 and control circuitry 22 (e.g., control circuitry formed from components 14, as described in connection with FIG. 1). Control circuitry 22. Fabric 12 may be woven fabric, knit fabric, braided material, felt, or other suitable fabric formed from intertwined strands of material. In the illustrative arrangement of FIG. 2, fabric 12 is woven fabric that is formed from warp strands 20 and weft strands 18. Fabric 12 may include insulating strands such as strands 181 and 201 and may include conductive strands such as strands 18C and 20C. Conductive strands of material in fabric 12 may be used in conveying signals between control circuitry 22 and electrical components (see, e.g., illustrative electrical component 24, which has a first terminal coupled to conductive strand 20C and a second terminal coupled to conductive strand 18C).

Components such as component 24 may be input-output components such as buttons, touch sensors, light-based sensors such as light-based proximity sensors, force sensors, environmental sensors such as temperature sensors and humidity sensors, other sensors, status indicator lights and other light-based components such as light-emitting diodes for forming displays and other light-emitting structures, vibrators or other haptic output devices, etc. In configurations such as these, circuitry 22 may gather sensor signals or other signals from components 24 using conductive strands in fabric 12 or may apply control signals to components 24 using conductive strands in fabric 12 (e.g., to light up light-emitting diodes in fabric 12 to display images or other light output on fabric 12, to generate haptic output, etc.).

If desired, fabric 12 may include a grid of intersecting horizontally extending conductive strands (e.g., weft strands 18C in the example of FIG. 2) and perpendicular vertically extending conductive strands (e.g., warp strands 20C in the example of FIG. 2). The conductive paths (lines) in the grid formed from conductive strands 18C and 20C may serve as capacitive electrodes in a capacitive touch sensor (touch sensor grid). In this type of arrangement, control circuitry 22 may include capacitive touch sensor circuitry that is coupled to the conductive strands in the grid. The touch sensor circuitry may provide drive signals to the vertical (or horizontal) lines and may gather corresponding sense signals from the horizontal (or vertical) lines. Capacitive coupling between the drive and sense lines varies in the presence of a user's finger over a drive-line-to-sense-line intersection. As a result, the touch sensor circuitry in control circuitry 22 can process the drive and sense signals to determine which of the intersections of the conductive horizontal and vertical lines are being overlapped by a user's finger(s) or other external objects. Touch input that is detected this way (e.g., multitouch input corresponding to a pinch to zoom gesture, a multi-finger or single finger tap or swipe, or other touch input) may be used by item 10 to perform any suitable action. For example, in configurations in which item 10 has the ability to play media for a user, the touch input may be used to control media playback operations, in configuration in which item 10 has the ability to display images, displayed image content may be adjusted based on the touch input, in configurations in which item 10 includes or communicates with cellular telephone circuitry, touch input may direct item 10 to answer or place a telephone call, etc.

Fabric 12 may be formed inside item 10 or may be formed on the surface of item 10 (e.g., on an exterior wall, the surface of a housing, the surface of a strap or other fabric structure, etc.). In configurations in which conductive strands of material in fabric 12 are used in forming a grid of capacitive touch sensor electrodes, sensor performance may be enhanced by ensuring that fabric 12 is uncovered (or only thinly covered) with additional layers of material (e.g., additional fabric layers, plastic layers, etc.). In an uncovered state, a user's fingers can come into close proximity to the intersections between the conductive strands in a capacitive touch sensor grid, thereby enhancing signal-to-noise ratios.

Particularly in configurations in which fabric 12 forms an outer surface of some or all of item 10, it may be desirable to visually hide conductive strands 12C and 18C. For example, it may be desirable to match the appearance of conductive strands 12C and 18C to insulating strands 121 and 181, so that strands 12C and 18C are visually indistinct from strands 121 and 181. In this way, fabric 12 may have a desired outward appearance even in the presence of conductive strands that are being used to gather touch sensor input for a fabric touch sensor or that are being used to route signals for other components.

With one illustrative arrangement, the appearance of insulating and conductive strands may be matched by coating the insulating and conductive strands with similarly or identically colored polymer coatings or other surface treatment, by coating metal wires with colored polymer to match the color of solid polymer fibers, etc. With another illustrative arrangement, conductive fibers may be embedded in the center of a bundle of insulating fibers. In this way, the outer insulating fibers that surround the interior conductive fibers may help shield the interior conductive fibers from view.

Figure 3:
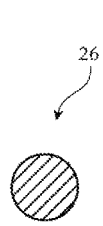
FIG. 3 is a cross-sectional side view of an illustrative fiber in accordance with an embodiment.
Figure 4:
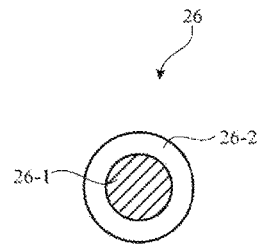
FIG. 4 is a cross-sectional view of an illustrative fiber with a core and an outer coating in accordance with an embodiment.
Figure 5:
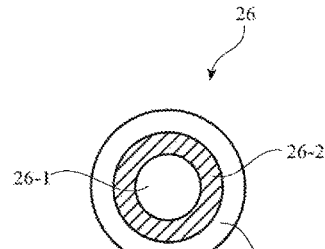
FIG. 5 is a cross-sectional view of an illustrative fiber with a core and two coating layers in accordance with an embodiment.

FIGS. 3, 4, and 5 are cross-sectional side views of illustrative fibers (sometimes referred to as monofilaments) that may be used in forming insulating and conductive yarns.

In the example of FIG. 3, fiber 26 is formed from a single material. In insulating fibers, the material may be a polymer, a natural insulating material such as cotton, flax, silk, or wool, or other dielectric. In conductive fibers, the material may be a conductive material such as metal (e.g., copper).

In the example of FIG. 4, fiber 26 has a core portion such as fiber core 26-1 and has an exterior coating layer such as coating 26-2. In insulating fibers, core 26-1 and coating 26-2 may be polymers, natural materials, or other dielectric. For example, core 26-1 may be formed from a polymer that exhibits desired properties for use in fabric 12 such as strength and elasticity, whereas coating 26-2 may be a colored polymer that is used to impart fiber 26 with a desired color or other appearance. In conductive fibers, core 26-1 of FIG. 4 may be a conductive material (e.g., copper) and exterior coating 26-2 may be a polymer (e.g., a colored polymer such as a white, gray, or black polymer or a polymer of other suitable colors such as red, green, blue, etc.). Conductive fibers may also be formed from polymer cores (i.e., core 26-1) coated with metal coatings (i.e., coating 26-2).

If desired, fiber 26 may be formed from three or more layers such as layers 26-1, 26-2, and 26-3 of FIG. 5. In insulating fibers, layers 26-1, 26-2, and 26-3 may be polymers. In conductive fibers, one or more of layers 26-1, 26-2, and 26-3 may be formed from conductive materials such as metal and the remaining layer(s) may be formed from polymer (as examples).

Figure 6:
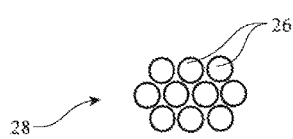
FIG. 6 is a cross-sectional view of an illustrative yarn formed from multiple fibers in accordance with an embodiment.

Yarn may be formed from multiple fibers 26, as illustrated by yarn 28 of FIG. 6. Fibers 26 for yarn 28 may be intertwined by spinning, braiding, or by otherwise intertwining fibers 26. Insulating yarn 28 may be formed from a collection of insulating fibers 26. Conductive yarn may be formed from fibers 26 that are all conductive or may be formed from both insulating and conductive fibers 26.

Figure 7:
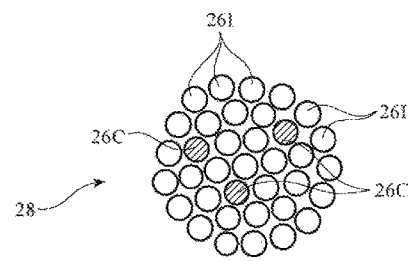
FIG. 7 is a cross-sectional view of an illustrative yarn in which conductive fibers are surrounded by insulating fibers in accordance with an embodiment.

In the example of FIG. 7, yarn 28 includes both insulating fibers 26I and conductive fibers 26C and is therefore conductive. Fibers 26I and fibers 26C may be spun together in a yarn spinning tool or may otherwise be intertwined to form yarn 28 (e.g., using braiding equipment, etc.). Fibers 26C may be bare metal wire (e.g., copper wire) as illustrated by fiber 26 of FIG. 3 or may have multiple layers of material. Because conductive fibers 26C are located in the interior of yarn 28 of FIG. 7, conductive fibers 26C are hidden from view.

Conductive yarns such as yarn 28 of FIG. 7 may visually match the appearance of insulating yarns such as yarn 28 of FIG. 6 that is formed only from insulating fibers 26I (e.g., insulating fibers 26 in yarn 28 of FIG. 6 may be formed from the same polymer that is used in forming the insulating fibers in conductive yarn 28 of FIG. 7). This may make the conductive yarn visually indistinguishable from the insulating yarn. Fabric 12 that is formed using both the insulating and the conducting yarn will therefore appear as if it contains only insulating yarn.

As an example, woven fabric 12 may be formed in which the fabric has insulating warp and weft yarns with interspersed conductive warp and weft yarns as illustrated by insulating strands 20I and 18I of fabric 12 of FIG. 2 and interspersed conductive strands 20C and 18C. In general, insulating strands in fabric 12 such as insulating strands 18I and 20I may be formed from one or more insulating fibers (monofilaments) such as insulating fibers 26 of FIGS. 3, 4, and 5 and/or may be formed from one or more insulating yarns 28, each of which is formed from a set of two or more insulating fibers 26. Likewise, conductive strands in fabric 12 such as conductive strands 18C and 20C may be formed from one or more conductive fibers (monofilaments) such as conductive fibers 26 of FIGS. 3, 4, and 5 and/or may be formed from one or more conductive yarns 28 each of which includes at least some conductive fibers. Configurations in which the insulating strands of fabric 12 are insulating yarns and in which the conductive strands of fabric 12 are conductive yarns may sometimes be described herein as an example.

In arrangements in which fabric 12 includes yarns 28 with multiple fibers, each yarn 28 may contain any suitable number of fibers. As an example, each yarn 28 may contain 2-200 fibers (monofilaments such as monofilaments 26 of FIGS. 3, 4, and 5), may contain 10-150 fibers, may contain 70-160 fibers, may contain more than 10 fibers, may contain 5-55 fibers, may contain more than 20 fibers, may contain more than 100 fibers, may contain fewer than 500 fibers, may contain fewer than 300 fibers, may contain fewer than 150 fibers, may contain 25-35 fibers, may contain fewer than 140 fibers, may contain 10-60 fibers, may contain 34 fibers, or may contain other suitable numbers of fibers.

Each fiber 26 may have a diameter of 8-100 microns, 2-500 microns, more than 5 microns, more than 10 microns, more than 20 microns, more than 40 microns, less than 200 microns, less than 150 microns, less than 100 microns, less than 50 microns, or any other suitable diameter. In configurations in which fibers 26 include coating layers, each coating may have a thickness of 1-40% of the diameter of the fiber, 1-15% of the diameter of the fiber, more than 0.2% of the diameter of the fiber, less than 5% of the diameter of the fiber, less than 35% of the diameter of the fiber, etc.

Fibers 26 and yarns 28 may have any suitable linear density. As an example, yarn 28 may be a 100 denier yarn, may be a 40-200 denier yarn, may be a 70-150 denier yarn, may be a 100 to 130 denier yarn, may be a 110 denier yarn, may have a linear density of more than 10 denier, more than 75 denier, less than 300 denier, less than 180 denier, 50-160 denier, or any other suitable value.

The percentage of conductive fibers in yarn 28 may be 1-10%, more than 2%, more than 10%, more than 50%, 90-100%, less than 70%, less than 15%, or any other suitable value. Yarn 28 may, for example, have 10-50 insulating fibers and 2-10 conducting fibers. With an illustrative arrangement, yarn 28 is 110 denier yarn having 31 insulating fibers (e.g., polymer and/or natural fibers) and 4 conductive fibers (e.g., bare copper wires). The fibers in this illustrative example may all have the same size (e.g., a diameter in the range of 8-100 microns) or may have multiple sizes. If desired, yarn 28 may contain copper wires or other conductive monofilaments intertwined with multifilament insulating or conductive threads or may contain both conducting and insulating multifilament threads.

Yarn 28 may be formed by intertwining fibers 26 using intertwining techniques such as braiding or spinning. Braided yarns may be stiffer than spun yarns. In some fabrics, spun yarn may provide a desired flexible characteristic.

Figure 8:
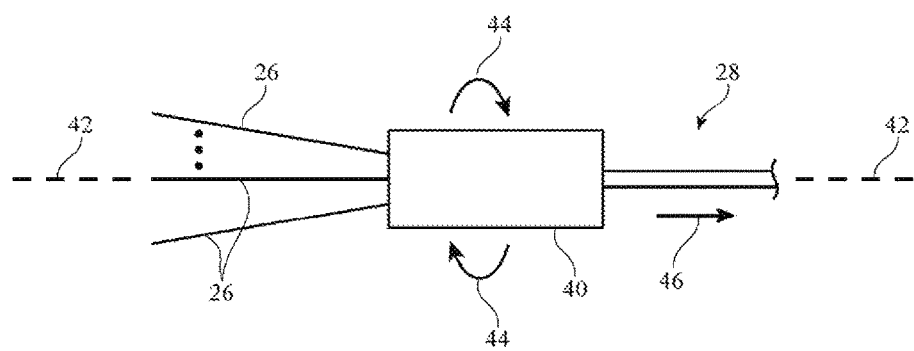
FIG. 8 is a diagram showing how a yarn may be formed by spinning together insulating and conductive fibers in a yarn fabrication tool accordance with an embodiment.

FIG. 8 is a diagram showing how yarn 28 may be produced by spinning together multiple fibers 26. As shown in FIG. 8, spinning tool 40 may spin multiple fibers 26 together by rotating in direction 44 about rotational axis 42 to produce yarn 28 that is drawn in direction 46. Spinning equipment (e.g., tool 40 or other suitable yarn spinning tools) may, in general, use ring-spinning techniques, air-jet techniques, rotor spinning techniques, or other suitable yarn spinning techniques. During spinning, copper wires or other conductive fibers may be incorporated into the center portion of yarn 28, as illustrated by the interior position of conductive fibers 26C and insulating fibers 26I in yarn 28 of FIG. 7 (which shows how fibers 26C may be shielded from view by fibers 26I).

Figure 9:
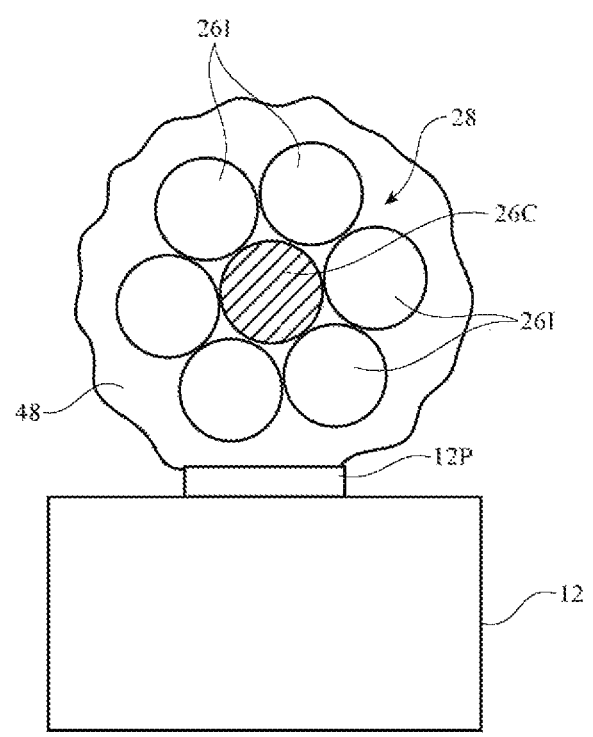
FIG. 9 is a cross-sectional view of illustrative conductive yarn and an associated electrical component showing how conductive material such as solder may couple conductive fibers in the yarn to a contact such as a solder pad on the electrical component in accordance with an embodiment.

Conductive connections may be formed to conductive fibers 26C using conductive adhesive, welds, crimped metal prongs or other fasteners, solder, or other conductive attachment mechanisms. A cross-sectional side view of an illustrative connection between an electrical component and conductive fiber 26C in a yarn 28 that has surrounding insulating fibers 26I is shown in FIG. 9. Electrical component 14 has contacts such as contact pad 14P. When molten, solder 48 may penetrate into the fibers of yarn 28 and contact conductive fiber 26C. Solder 40 may also contacts pad 14P and thereby form an electrical connection (solder joint) between electrical component 14 and conductive yarn 28. Connections of the type shown in FIG. 9 may be used to couple components such as components 14 between respective warp and weft yarns. For example, illustrative electrical component 24 of FIG. 2 has a first terminal that is connected to conductive warp strand 20C (e.g., a conductive yarn 28) and has a second terminal that is connected to conductive weft strand 18C (e.g., a conductive yarn 28). Component such as component 24 of FIG. 2 and components 14 of FIGS. 1 and 9 may be sensors, light-emitting diodes, buttons, audio components, haptic components (e.g., components formed from electromagnetic actuators, piezoelectric components, electroactive polymers or other devices that generate vibrations or other tactile output such as feedback associated with use of an overlapping touch sensor), capacitive touch sensors, force sensors, light-based proximity sensors, or other devices.

Conductive yarn 28 may be woven into fabric 12, may form conductive strands in a knitted fabric, may be intertwined with insulating yarn using braiding techniques, may be sewn into fabric (e.g., using embroidery), may be attached to fabric 12 using adhesive, may be embedded in a sheet of polymer (e.g., a thermoplastic or thermoset resin that forms an interior structure in item 10 or that serves as an external housing wall or other external structure in item 10), may be sandwiched between multiple layers of material (fabric, plastic sheets, metal, etc.), and/or may otherwise be incorporated into item 10. Conductive yarn 28 may be used to carry signals (e.g., control signals, data signals, communications signals, sensor signals, etc.) and/or may be used in forming conductive electrode pads or other conductive structures (e.g., capacitive sensor electrode pads for capacitive buttons, a capacitive sensor slider-type input device with electrodes formed from conductive yarn, and other capacitive sensor input devices having an array of electrodes formed from conductive yarn at various input locations on item 10, grid-shaped electrodes that form an associated array of capacitive sensor intersection points between overlapping conductive yarns, etc.).

The foregoing is merely illustrative and various modifications can be made by those skilled in the art without departing from the scope and spirit of the described embodiments. The foregoing embodiments may be implemented individually or in any combination.

What is claimed is:

1. An item, comprising:
   insulating yarn;
   conductive yarn intertwined with the insulating yarn; and
   control circuitry coupled to the conductive yarn, wherein the conductive yarn comprises a plurality of insulating fibers and a plurality of metal wires that are intertwined with the insulating fibers and that are hidden from view by the insulating fibers, wherein the insulating yarn comprises a first polymer, and wherein the insulating fibers comprise a second polymer that matches a color of the first polymer.

2. The item defined in claim 1, wherein the metal wires comprise copper wires.

3. The item defined in claim 2, wherein the insulating fibers have diameters of 8-100 microns.

4. The item defined in claim 3, wherein the copper wires have diameters of 8-100 microns.

5. The item defined in claim 4, wherein the conductive yarn has a linear density of 50-160 denier.

6. The item defined in claim 5, wherein the conductive yarn has 10-50 of the insulating fibers.

7. The item defined in claim 6, wherein the conductive yarn has 2-10 of the conducting fibers.

8. The item defined in claim 7, further comprising fabric that contains the insulating yarn and the conductive yarn.

9. The item defined in claim 8, wherein the first polymer and the second polymer are the same material.

10. The item defined in claim 8, wherein the fabric forms an exterior structure in the item.

11. The item defined in claim 8, wherein the fabric forms an exterior portion of a housing wall.

12. The item defined in claim 11, wherein the control circuitry comprises capacitive touch sensor circuitry.

13. The item defined in claim 12, wherein the conductive yarn is configured to form a capacitive electrode grid for a capacitive touch sensor.

14. The item defined in claim 8, further comprising electrical components that are electrically coupled to the conductive yarn.

15. The item defined in claim 14, further comprising solder with which the electrical components are electrically connected to the conductive yarn.

16. A fabric-based item, comprising:
    capacitive touch sensor circuitry;
    capacitive touch sensor electrodes coupled to the capacitive touch sensor circuitry, wherein the capacitive touch sensor electrodes comprise conductive yarn having a plurality of conductive fibers and a plurality of insulating fibers that surround the conductive fibers in the yarn and thereby hide the conductive fibers from view; and
    insulating yarns located between the capacitive touch sensor electrodes, wherein the insulating yarns and the insulating fibers are formed from the same material.

17. The fabric-based item defined in claim 16, further comprising fabric that is formed from the conductive yarn and intertwined insulating yarn.

18. An item, comprising:
    control circuitry;
    fabric having conductive warp yarn and conductive weft yarn that is coupled to the control circuitry and having insulating warp yarn and insulating weft yarn, wherein the conductive warp and weft yarn comprise spun yarn having conductive fibers and insulating fibers and wherein the insulating fibers hide the conductive fibers from view; and
    solder that penetrates through the insulating fibers to contact at least one of the conductive fibers.

19. The item defined in claim 18, wherein each of the conductive fibers comprises a bare copper wire.

* * * * *